Patented Sept. 27, 1949

2,482,862

UNITED STATES PATENT OFFICE 2,482,862

TREATMENT OF CELLULOSE ETHERS

William H. Myers, Wilmington, Del., assignor to Hercules Powder Company, Wilmington, Del., a corporation of Delaware No Drawing. Application August 13, 1945,
Serial No. 610,672

4 Claims. (Cl. 260—232)

This invention relates to a process for the preparation of cellulose ethers. More particularly, it is concerned with an improved method of producing a stable cellulose ether by the substantial elimination of objectionable inorganic constituents and the subsequent introduction of components favoring improved stability.

Cellulose ethers have been prepared according to various procedures described in the art, usually by the reaction of alkali cellulose and an etherifying agent. However, considerable difficulty has been experienced in adjusting the processes so as to give products having satisfactory stability for use in molding, protective coatings, films, etc.

Cellulose ethers have been treated with acids, by a number of methods and for a variety of reasons. In fact, viscosity reduction methods usually entail the use of acid hydrolysis. A major objection to all these previously known acid treatments is the unstable condition in which the cellulose ether is left, especially in regard to viscosity stability.

Attempts have been made to follow the acid treatment with an alkaline neutralization to remove the last traces of acids, but this appears to have been unsuccessful in enabling the cellulose ethers to regain reasonable stability. The constituents or conditions causing this undesirable condition have not been sufficiently elucidated to permit the formation of a theory regarding them. However, decomposition products or weak linkages possibly play a part in the unstable condition of previously prepared acid treated cellulose ethers.

It has been found that during various stages of cellulose ether formation and treatment carboxyl groups are formed which are distributed along the cellulose chain, and that certain cations, especially iron, when bound thereto, are a major cause of instability. Now, in accordance with this invention, it has been found that cations neutralizing carboxyl groups attached to the cellulosic nucleus of cellulose ethers may be substantially completely removed by reacting a solution of the cellulose ether with certain solid organic acidic substances, as hereinafter described, without the adverse effect usually encountered in acid treatment, separating the cation-free cellulose ether solution, and reneutralizing the carboxyls with a cation chosen to promote high stability.

Preferably, these steps are carried out at temperatures between 20° and 100° C. The organic acidic substance must be chosen so as to be insoluble in the cellulose ether solution. Further, it should be strong enough in acid activity to remove cations from the cellulosic carboxyls, but not so strong as to cause degradation of the cellulose ether during the period of the cation removal at the temperature employed.

The following examples illustrate various ways of carrying out the invention.

Example 1

A crude ethyl cellulose, having an ash content of 0.115% (about 3% of which was iron), a viscosity of 100 centipoises, and ethoxyl of 48.0% were dissolved in ethyl alcohol to form a 10% solution. One part of pulverized pectic acid per 10 parts of ethyl cellulose was suspended in the solution after which the suspension was stirred for one hour. Subsequently, it was filtered after the addition of a diatomaceous earth filter aid (Celite). The solution was tested for ash and found to contain 0.007%, based on the ethyl cellulose. No iron could be detected in the solution. 0.00197 part sodium hydroxide per part ethyl cellulose was added to the solution, with stirring, after which the ash was again tested, and found to be 0.120%, based on the ethyl cellulose. No free sodium hydroxide was present in the solution at the end of five minutes stirring. The ethyl cellulose was recovered in the form of films cast from the solution. The product was highly stable when subjected to a temperature of 120° C. for 24 hours. Films of the untreated iron-containing material embrittled under similar conditions.

Example 2

An unneutralized oxidized coal (Zeo-Karb H) was pulverized and extracted with isopropyl alcohol to remove the small amount of alcohol-soluble components. An ethyl cellulose containing 0.23% ash (of which about 2% was iron) and having 14 centipoises viscosity and 48.1% ethoxyl was dissolved in isopropyl alcohol to form a 15% solution. One part of the alcohol-extracted-oxidized-coal for every 20 parts of ethyl cellulose was suspended in the solution. The suspension was agitated for two hours, after which the oxidized coal was separated by filtration. No detectable amount of ash remained in the solution. The ash-free ethyl cellulose was precipitated in a large excess of water which contained .0036 part magnesium hydroxide and .0012 part sodium hydroxide per part ethyl cellulose. Ten minutes after precipitation had been completed the aqueous precipitant contained no hydroxides. The ethyl cellulose was isolated by filtration, dried in vacuum, and tested for ash, It contained 0.22% ash and less than 1 part per million of iron. The product had an improved color over that of the untreated material, and remained flexible when subjected to a temperature of 120° for 24 hours.

*Example 3*

One part of an unneutralized carboxymethylcellulose was pulverized and added to 10 parts of an ethyl cellulose solution identical with that used in Example 2. The suspension was heated to reflux temperature and stirred while refluxing for one hour. The carboxymethylcellulose was removed by use of a high speed centrifuge. The ethyl cellulose was precipitated in a large excess of water. A sample of the precipitate was tested and found to contain 0.03% iron-free ash. The precipitate was stirred in the aqueous alcoholic precipitating bath while .0011 part calcium hydroxide and .0030 part sodium hydroxide per part of ethyl cellulose ether were added. Fifteen minutes after these additions, no hydroxide was detected in the aqueous alcohol. After filtration and drying, the ethyl cellulose was found to contain 0.26% iron-free ash, and to be stable.

*Example 4*

The same ethylcellulose used in Example 2 was also employed here in the form of a 15% ethyl alcoholic solution. An unneutralized sulfonated polyhydroxy benzene formaldehyde resin (Amberlite IR 100 H (AG)) was pulverized and extracted with ethyl alcohol until free of alcohol-soluble constituents. One part of the extracted resin was suspended in the ethyl cellulose solution for every 50 parts of ethyl cellulose. After an hour's stirring, the solution was filtered and a second portion of the extracted resin, the same proportion to the ethyl cellulose, was stirred with the solution for 30 minutes. The solution was filtered and tested for ash, which was found to be 0.05% based on the ethyl cellulose. While the ethyl cellulose was still in solution, .0018 part barium hydroxide and .0017 part sodium hydroxide per part of ethyl cellulose were added. The ethyl cellulose was precipitated in rapidly agitated boiling water which flashed off the solvent and thus precipitated granular ethyl cellulose. After filtration and drying, the ethyl cellulose was again tested for ash, which was found to be 0.20%, with no iron being found. The product was lighter in color than the starting material.

Solid organic substances, containing acidic groups, equivalent to those shown in the examples may be used in carrying out the present invention; provided that they are insoluble in the cellulose ether solution, do not impart color thereto, do not degrade the cellulose ether at the reaction temperature and yet have acidic groups of sufficient strength to remove cations from the cellulosic carboxyl groups. Polymeric substances, such as the pectic acid shown in Example 1; the carboxymethylcellulose shown in Example 3; substances such as the oxidized coal shown in Example 2; and resinous material such as the sulfonated polyhydroxy benzene formaldehyde resin given in Example 4 have been found especially suitable due to their generally insoluble nature in cellulose ether solvents. It has been found that acids of this character are not absorbed by the cellulose ether, and do not form complexes therewith. Other materials which are suitable for use in carrying out the present invention include lignosulfonic acids, formaldehyde-pyrogallol resins, naphthol sulfonic acids such as the 1, 2 or the 2, 6 isomer, and gluconic acid. These acids are strong enough to remove cations from cellulosic carboxyls when used in excess thereof, but are not so strong as to hydrolyze or degrade the cellulose ether under the conditions employed.

It is a preferred practice to use a large excess of the acidic material above that needed to combine with the cations to be removed. Consequently, the acidic substance recovered from a cation removal operation may be reused a number of times until its capacity for combining with cations has decreased to a marked extent. At such time, the cation combining capacity of the material may be regenerated by giving the spent material a mineral acid treatment to remove cations and replace hydrogen on the acidic groups. While the proportion of acidic material to cellulose ether may vary within wide limits, a ratio range from about 1:10 and 4:1 has been found to be most efficient, and ratios between about 1:5 and 2:1 are preferred. When a number of cation removal steps are used, the proportion of acidic material in any one step may be as low as 1:50 or even less.

Any solvent may be used, besides the alcohols shown in the examples, which does not react with the cellulose derivative and does not react with or dissolve the organic acid substance which is used. Dependent upon these three conditions the solvents may be alcohols, such as methyl, ethyl or isopropyl; ketones, such as acetone, dimethyl ketone or methyl ethyl ketone; ethers, such as methyl, ethyl or isopropyl; aromatic hydrocarbons, such as benzene, toluene, or xylene; chlorinated hydrocarbons, such as methylene chloride, chloroform or carbon tetrachloride; mixtures of solvents may be used also.

Although the invention has been illustrated with ethyl celluloses, other cellulose ethers respond equally well to the treatment. Methyl cellulose, benzyl cellulose, and the mixed ethers may be so treated. Salts of carboxymethylcellulose are special cases requiring some discussion. While these materials may be freed of their neutralizing cations by the method of the present invention, its use for such a purpose is probably not practical. However, the free-acid form of carboxymethylcellulose is useful for removing the cations bound by the carboxyls formed accidentally during the processing of other cellulose ethers since carboxyls of the carboxy-methyl groups are strong enough to remove the cations in question. This difference in acid activity is apparently controlled by the fact that the carboxyl groups accidentally formed are attached directly to the cellulose molecule, rather than to the alkyl group.

The invention is not restricted to cellulose ethers made by any particular method. Cellulose ethers are generally formed by treatment of alkali cellulose with an etherifying agent, such as an alkyl halide or sulfate. Diluents or solvents may be used during etherification and etherification temperatures between about 60° C. and 200° C. are normal. In the formation of ethyl cellulose, ethyl chloride is the usual ethylating agent and the reaction is preferably conducted in an autoclave. A considerable excess of ethyl chloride is ordinarily used; in fact, it may act as solvent as well as etherifying agent. After etherification, the product is usually precipitated by distillation of volatile reactants, and the product is washed to remove by-products such as sodium chloride. By such procedure substantially all substances not combined with the cellulose ether may be removed, leaving, however, the cellulosic carboxyls neutralized as hereinbefore described.

The cations neutralizing these carboxyls, such as iron, may cause color development, or may cause haze; such phenomena may occur when a cellulose ether film is exposed to weathering. On the other hand, sodium has a stabilizing effect, and neutralization of the carboxyls with sodium is therefore preferred. Even more stable cellulose ethers are obtained by neutralizing the cellulosic carboxyls with a combination of sodium and divalent cations, such as magnesium, calcium, or barium (see Examples 2, 3, 4, respectively) or copper, nickel, and silver. Hence, the neutralization of the cellulosic carboxyls with combinations of sodium and divalent cations is a still more preferred procedure. Ratio of divalent cation to sodium may be from about 1:10 to about 5:1, but ratios between about 1:3 and 2:1 are preferred. Potassium will give a stabilizing effect similar to that of sodium. Chromium and gold also improve the stability of cellulose ethers.

While Examples 1, 2, and 4 show the use of room temperature as one of the treatment conditions, the reaction may be carried out at any temperature up to the boiling point of the solution, as illustrated in Example 3. It is preferred that room temperature, that is, about 20° C., be used, because of economy and ease of control, but temperatures up to about 100° C. may be used to accelerate the reaction. Above about 100° C. there is danger of appreciable decomposition of the cellulose ether.

The invention may be carried out in numerous ways. The solid organic acidic substance may be suspended in and stirred with a solution of the cellulose derivative. In this case, a single addition of the acidic material may be used, but a preferred embodiment is the use of multiple additions of the agent, separating the solution from the agent between successive additions. While stirring is a preferred means of treatment, another suitable means is by percolation, allowing the solution to filter through a bed of the ion exchange agent in a column or tower. Under such conditions it is preferred that pressure be applied at the top of the tower or column to increase the rate of percolation. As shown in Example 1, a filter-aid also may be used to increase the rate of flow and aid in the complete removal of acidic substance during filtration. Since the time of contact may be insufficient to remove all cations during one passage through the column, the solution may be recycled through the same column or passed through other columns containing the same or another acidic organic material.

As shown by Examples 2 and 3, the product may be precipitated from solution before treatment with the neutralizing substance. Alternatively, the derivative may be precipitated into a solution of the neutralizing agent or neutralization may be carried out after precipitation. In either case, the unneutralized cellulosic carboxyl groups react rapidly with any cations with which they come in contact.

Where, in the examples, viscosities are expressed in centipoises, this will be understood to mean the viscosity of a 5% solution of ethyl cellulose in 80:20 toluene-alcohol, measured at 25° C.

This invention enables close control of the product quality of cellulose derivatives. By using the process of the invention, cations causing haze, color, or instability may be substantially completely eliminated and replaced by cations which improve or maintain color and viscosity stability to heat and oxygen but which do not increase haze or add color.

The prior art methods of haze elimination, that is, treatment with mineral acid or cyanide, gave inconsistent and unsatisfactory results, complete elimination of reagents was difficult, and the reagents were dangerous to handle. The present invention allows intimate contact so as to effect complete removal of cations, and inexpensive methods for continuous or batch operation, both without danger or degradation of the cellulose derivative.

What I claim and desire to protect by Letters Patent is:

1. In a process for improving the heat stability of an organic-solvent-soluble cellulose ether in which undesirable contaminating metallic cations which cause instability are removed from the cellulose ether and are replaced by stabilizing metallic cations, the improvement which comprises initially treating a solution of said cellulose ether in a neutral organic solvent with a solid organic cation exchange reagent having acidic groups to remove substantially all metallic cations from said cellulose ether, and then separating said cellulose ether solution from said exchange reagent, said exchange reagent being insoluble in said cellulose ether solution and having no degrading effect on said cellulose ether during said treatment.

2. A process according to claim 1 in which the cation exchange reagent is pectic acid.

3. A process according to claim 1 in which the cation exchange reagent is oxidized coal.

4. A process according to claim 1 in which the cation exchange reagent is sulfonated polyhydroxy benzene formaldehyde resin.

WILLIAM H. MYERS.

REFERENCES CITED

The following references are of record in the file of this patent:

UNITED STATES PATENTS

| Number | Name | Date |
| --- | --- | --- |
| 2,118,664 | Bradshaw | May 24, 1938 |
| 2,178,630 | Finlayson | Nov. 7, 1939 |

OTHER REFERENCES

Ott, "Cellulose and Cellulose Derivatives," Chapter 2, pages 113–118.

Tiger et al., "Industrial and Engineering Chem.," vol. 35, 1943, pages 186–192.